(12) United States Patent  
Akbari-Dilmaghani

(10) Patent No.: US 8,816,825 B2  
(45) Date of Patent: Aug. 26, 2014

(54) TRANSPONDER

(75) Inventor: Rahim Akbari-Dilmaghani, Graz (AT)

(73) Assignee: Maxim Integrated Products, Inc., San Jose, CA (US)

( * ) Notice: Subject to any disclaimer, the term of this patent is extended or adjusted under 35 U.S.C. 154(b) by 286 days.

(21) Appl. No.: 13/464,244

(22) Filed: May 4, 2012

(65) Prior Publication Data

US 2012/0280795 A1    Nov. 8, 2012

(30) Foreign Application Priority Data

May 5, 2011  (DE) .......................... 10 2011 050 129

(51) Int. Cl.
*H04Q 5/22*    (2006.01)

(52) U.S. Cl.
USPC ......... 340/10.1; 340/572; 340/5.61; 343/867; 235/375; 336/83

(58) Field of Classification Search
CPC ............ G06K 7/10336; G06K 19/073; G06K 19/07327; H04B 5/0087; H04B 5/0012; H04B 5/00
USPC .............. 340/5.61, 10.1, 10.34, 572.1–572.9, 340/5.2; 343/867; 235/375; 336/83
See application file for complete search history.

(56) References Cited

U.S. PATENT DOCUMENTS

| | | | |
|---|---|---|---|
| 5,493,275 A * | 2/1996 | Easter ......................... | 340/572.3 |
| 6,970,679 B2 * | 11/2005 | Blatz et al. .................. | 455/41.1 |
| 6,989,750 B2 * | 1/2006 | Shanks et al. .............. | 340/572.4 |
| 7,142,090 B2 * | 11/2006 | Ueda et al. .................. | 340/5.61 |
| 7,692,529 B2 * | 4/2010 | Hagl et al. .................. | 340/5.61 |
| 2005/0237163 A1 * | 10/2005 | Lee et al. .................... | 340/10.51 |
| 2006/0286938 A1 * | 12/2006 | Murdoch ..................... | 455/73 |
| 2011/0156640 A1 * | 6/2011 | Moshfeghi ................... | 320/108 |
| 2012/0280795 A1 * | 11/2012 | Akbari-Dilmaghani ..... | 340/10.1 |

* cited by examiner

*Primary Examiner* — George Bugg  
*Assistant Examiner* — Edny Labbees  
(74) *Attorney, Agent, or Firm* — North Weber & Baugh LLP

(57) ABSTRACT

Proposed is a transponder for receiving a wireless electromagnetic interrogation signal and for transmitting a wireless electromagnetic response signal with a first coil acting as an antenna for generating a first wired electrical receive signal from the interrogation signal, and with at least one further coil acting as an antenna for generating a further wired electrical receive signal from the interrogation signal, wherein an axis of the first coil and an axis of the further coil are aligned differently in the space, wherein in each case one full-wave rectifier for rectifying the respective receive signal is assigned to the coils, wherein a summing element for summing up the rectified receive signals generated by the full-wave rectifiers is provided in order to generate in this manner a pulsating sum signal, the frequency of which corresponds to twice the frequency of the interrogation signal.

12 Claims, 2 Drawing Sheets

TRANSPONDER

CROSS REFERENCE TO RELATED APPLICATIONS

This application claims priority under 35 U.S.C. §119 to Germany Application No. 10 2011 050 129.0, filed on May 5, 2011.

BACKGROUND

A. Technical Field

The present invention relates to a transponder for receiving a wireless electromagnetic interrogation signal and for transmitting a wireless electromagnetic response signal with a first coil acting as an antenna for generating a first wired electrical receive signal from the interrogation signal, and with at least one further coil acting as an antenna for generating a further wired electrical receive signal from the interrogation signal, wherein an axis of the first coil and an axis of the further coil are aligned differently in the space.

B. Background of the Invention

A transponder having three coils which are each arranged orthogonally to each other is known from EP 0 783 190 A1. Here, the signals of the three coils are in each case rectified by means of a diode and are used for charging a capacitor arrangement. The direct current voltage applied to the capacitor arrangement is then used as supply voltage for the transponder. By using the three coils arranged in each case orthogonally to each other, the supply voltage can be provided substantially independent of the transponder's position and spatial orientation with regard to the interrogator generating the interrogation signal.

However, in this manner, it is not possible to generate from the interrogation signal a time base signal which corresponds with the frequency of the interrogation signal and which may be required for synchronizing the transponder with the interrogation device.

SUMMARY OF THE INVENTION

It is an object of the present invention to provide a transponder which is configured for generating a time base signal from an interrogation signal, wherein generating the time base signal shall be substantially independent of the transponder's position and spatial orientation with regard to the interrogator generating the interrogation signal.

The object is achieved with a transponder of the aforementioned kind in that in each case one full-wave rectifier for rectifying the respective receive signal is assigned to the coils, wherein a summing element for summing up the rectified receive signals generated by the full-wave rectifier is provided in order to generate in this manner a pulsating sum signal, the frequency of which corresponds to twice the frequency of the interrogation signal.

A transponder is to be understood as a transmitting and receiving unit which upon reception of a wireless electromagnetic interrogation signal, transmits a wireless electromagnetic response signal. The interrogation signal is generated by an interrogator which is specifically configured for this and usually is also configured for receiving the response signal. Such combinations of transponders and interrogators can in particular be used for keyless access control and/or keyless usage control of motor vehicles.

Coils, in particular cylindrical coils, can generally be used as antennas for receiving wireless electromagnetic signals, wherein they substantially respond to the magnetic component of the field and convert it into a wired electrical signal. However, for this, they have a distinct directivity. If the axis of the coil is oriented toward the transmitter, the result is a reception minimum; in contrast, if the axis is perpendicular to the direction toward the transmitter, the result is a reception maximum.

Since the transponder according to the invention has at least two coils, the axes of which are aligned differently in the space, thus are not parallel, it is ensured that independent of the transponder's position and spatial orientation with regard to the interrogator generating the interrogation signal, at least one coil operates outside of the reception minimum. In this manner, at least one wired electrical receive signal is generated from the interrogation signal, wherein said receive signal has a level which is well above the level at the reception minimum.

A full-wave rectifier is generally to be understood as a rectifier in which both half-waves of the fed signal are provided with the same sign so that a pulsating DC signal is generated which has double the frequency of the fed signal. The full-wave rectifier can be a bridge rectifier which is formed by four diodes arranged in a full-wave bridge circuit (Graetz rectifier). According to the invention, each coil is provided with a full-wave rectifier so that from each receive signal, a rectified receive signal is obtained.

The rectified receive signals are then summed up by means of a summing element so that a pulsating sum signal is generated, the frequency of which corresponds to twice the frequency of the interrogation signal. The full-wave rectification ensures that the absolute values of the receive signals are added up regardless of their sign. In this manner it is ensured that the receive signals do not weaken each other or even cancel each other out during the adding process, which would happen without rectification if the transponder is aligned such that one of the coils is penetrated by the interrogation signal in the one direction, and another one of the receiving coils is penetrated in the other direction. In this case, the (non-rectified) receive signal of the one coil and the (non-rectified) receive signal of the other coil would have a phase shift of 180° so that during adding up, the two receive signals would partially, in extreme cases even completely, cancel each other out. The complete cancellation would occur when the levels of the two receive signal have the same value.

In contrast to that, the transponder according to the invention uses each half-wave of each of the receive signals for increasing the level of the sum signal so that independent of the transponder's position and spatial orientation with regard to the interrogator generating the interrogation signal, a stable sum signal is generated. The frequency of the sum signal corresponds here to twice the frequency of the received interrogation signal so that it can be used as a time base signal in particular for synchronizing the transponder with the interrogator.

The transponder according to the invention allows in particular the generation of a time base signal from an amplitude-modulated interrogation signal, the amplitude of which is changed in order to transmit different values, since the sum signal can be reliably generated even if the amplitude of the interrogation signal is very small due to the modulation.

According to an advantageous refinement of the invention, a total of three coils are provided, the axes of which are in each case arranged perpendicular to each other. In this manner, a coil arrangement is created which, as a whole, has only a very low directivity so that the sum signal can be reliably formed at any spatial orientation of the transponder.

According to an advantageous refinement of the invention, a comparator is provided for comparing the pulsating sum signal with a reference signal in order to generate in this manner a first clock signal, the frequency of which corresponds to twice the frequency of the interrogation signal. In general, a comparator is a circuit for comparing two input signals. Depending on which of the two input signals is greater, the output signal of the comparator takes a first value or a second value. Comparing now the sum signal by means of the comparator with a reference signal results in a binary clock signal at the output of the comparator, the frequency of which binary clock signal corresponds to twice the frequency of the interrogation signal, wherein the binary clock signal can be further processed in a simple manner. The comparator can be formed by means of a conventional operational amplifier.

According to an advantageous refinement of the invention, a low pass is provided for filtering the pulsating sum signal, wherein a filtered pulsating sum signal generated by means of the low pass is the reference signal fed to the comparator. A low pass is generally a filter which allows signal portions below a cutoff frequency to pass almost without attenuation and increasingly attenuates signal portions above the cutoff frequency. If now by means of such a low pass, a filtered pulsating sum signal is generated from the sum signal and used as a reference signal, an automatic adaptation of the reference signal to the level of the sum signal takes place so that changes of the current value of the sum signal result in a change of the value of the first binary clock signal so that the first clock signal comprises the clock information independent of the level of the sum signal.

According to an advantageous refinement of the invention, the first clock signal is fed to a frequency divider so as to generate a second clock signal with a lower frequency. A frequency divider is generally an arrangement which reduces the frequency of an input signal by a factor, preferably by an integer factor. Using a frequency divider allows to generate the second clock signal with a frequency as needed, wherein also the second clock signal contains the information on which frequency and phase that the interrogation signal has.

According to an advantageous refinement of the invention, the frequency divider is a frequency halver so that the second clock signal has the frequency of the interrogation signal. In the case of a frequency halver, the output signal generally has a frequency which corresponds to half of the frequency of the input signal. Thus, in the present case, a second clock signal is generated in a simple manner, the frequency of which corresponds to the frequency of the interrogation signal.

According to an advantageous refinement of the invention, each of the coils is associated with a limiter for limiting the amplitude of the respective receive signal. A limiter is to be understood as an arrangement which processes an input signal in such a manner that the output signal of the limiter does not exceed a maximum value. In the present case, the limiters can be configured for limiting the voltage of the respective receive signal in order to protect downstream components against high voltages which can be generated when receiving strong interrogation signals and/or interference signals. The limiters can advantageously be connected in a directly conductive manner to the respective coil, thus without interposing further components, in order to protect all components connected downstream of the coil.

According to a preferred refinement of the invention, in each case one amplifier for amplifying the respective receive signal is assigned to the coils. In this manner, the receive signals can be brought to a level sufficient for further processing, in particular for full-wave rectifying, even if the receive signal is very weak. The amplifiers can involve in particular voltage amplifiers. The amplifiers are preferably connected directly downstream of the limiter.

According to a preferred refinement of the invention, the limiter and the amplifier are configured as a structural unit. In this manner, the structure of the transponder is simplified.

According to a preferred refinement of the invention, in each case one voltage-to-current converter is assigned to the coils in order to feed the respective receive signal as a current signal to the summing element. A voltage-to-current converter is generally to be understood as a voltage-controlled current source. In the present case, the receive signal can be converted into a current signal which makes summing up the receive signals easier. In particular, the summing element can be configured as feedback operational amplifier, wherein the receive signals are fed together directly to the inverted input, thus without ohmic resistors connected upstream, which simplifies the structure of the transponder. Expediently, the voltage-to-current converters can be arranged in each case between the associated full-wave rectifier and the associated amplifier.

According to an advantageous refinement of the invention, the voltage-to-current converters are operational transconductance amplifiers. Operational transconductance amplifiers (abbreviated: OTA) are special operational amplifiers which have a high-impedance current output. By means of such operational transconductance amplifiers, the receive signals can be converted in a particularly simple manner into current signals.

According to an advantageous refinement of the invention, the transponder is at least partially implemented as a CMOS-integrated circuit. An integrated circuit is an integrated circuitry, which means that an electronic circuit comprising a plurality of electronic components and associated wiring is formed on a common substrate, also called chip. For this, a fully integrated construction can be provided, in which all electronic components of the transponder are arranged on exactly one substrate.

Furthermore, the transponder according to the invention can be produced using CMOS technology, which means that PMOS transistors, also called p-channel metal-oxide-semiconductor transistors, as well as NMOS transistors, also called n-channel metal-oxide-semiconductor transistors, can be arranged on a common substrate.

BRIEF DESCRIPTION OF THE DRAWINGS

The invention and its refinements is explained in more detail by means of the following figures. In the figures.

DETAILED DESCRIPTION OF THE PREFERRED EMBODIMENTS

Figure 1:
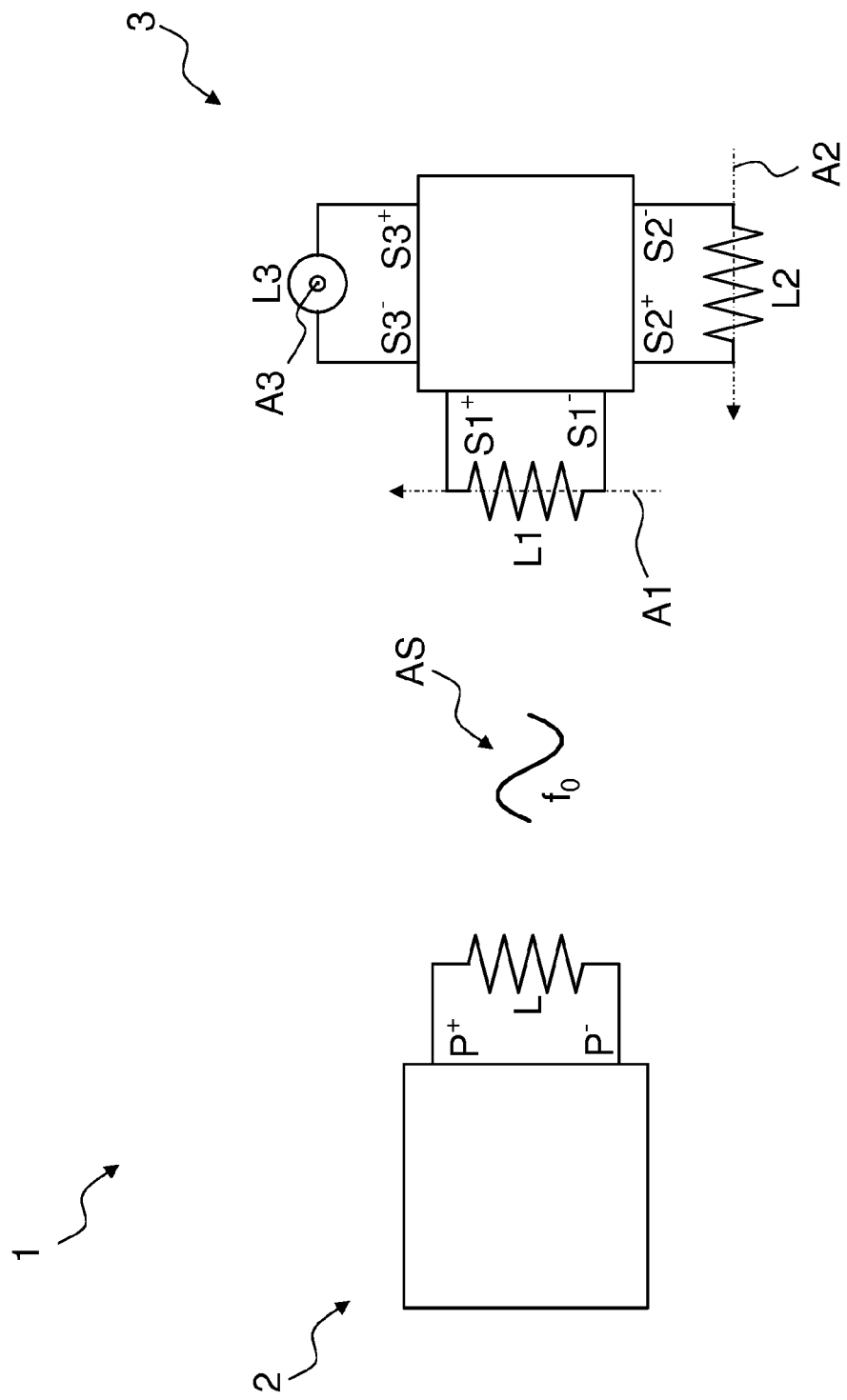
FIG. 1 shows an exemplary embodiment of a transponder according to the invention and an associated interrogator in a schematic illustration.

FIG. 1 shows a transponder system 1 that consists of an interrogator 2 and a transponder 3. Such a combination 1 of interrogator 2 and transponder 3 can in particular be used for keyless access control and/or for keyless usage control of motor vehicles. However, other applications are also possible.

The basic function is that a wireless interrogation signal AS with a frequency f0 is emitted by the interrogator 2. If only one transponder 3 is in range, said transponder receives the interrogation signal AS, evaluates it and generates a wireless response signal which is emitted by the transponder 3 and received and evaluated by the interrogator.

For this, the interrogator 2 has at least one coil L1 which acts as an antenna and has the connections P+ and P−. The transponder 3 has a first, in particular cylindrical, coil L1 which acts as an antenna and has an axis A1 and connections S1+ and S1−, a second, in particular cylindrical, coil L2 which acts as an antenna and has an axis A2 and connections S2+ and S2−, and a third, in particular cylindrical, coil L3 which acts as an antenna and has an axis A3 and connections S3+ and S3−.

The coils L1, L2, L3 each individually have a distinct directivity. If the respective axis A1, A2, A3 of a coil L1, L2, L3 points toward the interrogator 2, a reception minimum occurs; in contrast, if said axis is perpendicular to the direction toward the interrogator 2, a reception maximum occurs.

Since the axes A1, A2, A3 of the coils L1, L2, L3 are arranged perpendicular to each other, it is ensured, independent of the transponder's 3 position and spatial alignment, that not more than one of the coils L1, L2, L3 is operated at a reception minimum and that the two remaining coils of the coils L1, L2, L3 are operated under favorable conditions. In this manner, interrogation signals AS can be received substantially independently of the transponder's 3 position and spatial orientation with regard to the interrogator 2 generating the interrogation signal AS.

Figure 2:
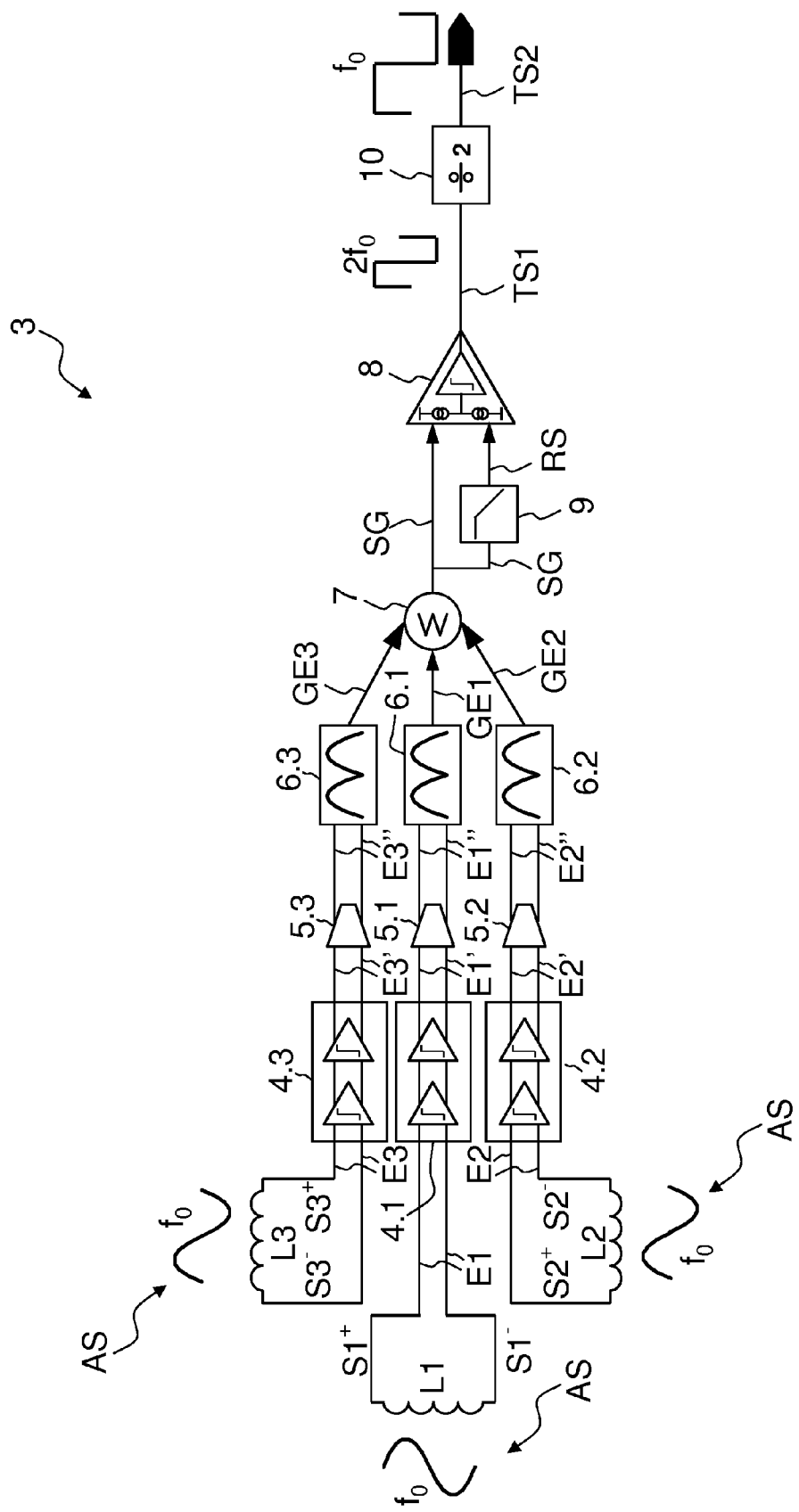
FIG. 2 shows a circuit diagram of the transponder of FIG. 1.

FIG. 2 shows a circuit diagram of the transponder 1 of the FIG. 1. Here, only that portion of the circuit of the transponder 1 is shown which is essential for understanding the invention. The coils L1, L2, L3 are used as antennas for receiving the interrogation signal AS, wherein they respond substantially to the magnetic component of the interrogation signal AS and convert it in each case in a wired, electrical receive signal E1, E2, E3.

The receive signals E1, E2, E3 are fed in each case to a structural unit 4.1, 4.2, 4.3 which has on its input side a limiter 4.1, 4.2, 4.3 and an amplifier 4.1, 4.2, 4.3 connected downstream of the latter.

The limiters 4.1, 4.2, 4.3 are configured for limiting the voltage of the respective receive signal E1, E2, E3 in order to protect in this manner downstream components against high voltages which can occur when receiving strong interrogation signals and/or interference signals. The limiters 4.1, 4.2, 4.3 are advantageously connected in a directly conductive manner to the respective coil L1, L2, L3, thus without interposing further components, in order to protect all components connected downstream of the respective coil L1, L2, L3. The amplifiers 4.1, 4.2, 4.3 are connected directly downstream of the respective limiter 4.1, 4.2, 4.3 and are implemented as voltage amplifiers. In this manner, the receive signals E1, E2, E3 can be brought to a level sufficient for further processing, even if the receive signal is very weak.

The limited and amplified receive signals E1', E2', E3' are now fed in each case to a voltage-to-current converter 5.1, 5.2, 5.3 in order to convert the respective receive signal E1', E2', E3' into a current signal. The voltage-to-current converters 5.1, 5.2, 5.3 can preferably be configured as operational transconductance amplifiers 5.1, 5.2, 5.3.

The receive signals E1", E2", E3" now present as current signals are fed in each case to a full-wave rectifier 6.1, 6.2, 6.3. A full-wave rectifier 6.1, 6.2, 6.3 is generally to be understood as a rectifier 6.1, 6.2, 6.3 in which both half-waves of the fed signal E1", E2", E3" are provided with the same sign so that a pulsating DC signal GE1, GE2, GE3 is generated which has double the frequency of the fed signal E1", E2", E3". The respective full-wave rectifier 6.1, 6.2, 6.3 can be a bridge rectifier which is formed by four diodes arranged in a full-wave bridge circuit (Graetz rectifier). According to the invention, each coil L1, L2, L3 is provided with a full-wave rectifier 6.1, 6.2, 6.3 so that from each receive signal E1", E2", E3", a rectified receive signal GE1, GE2, GE3 is obtained.

The rectified receive signals GE1, GE2, GE3 are then summed up by means of a summing element 7 so that a pulsating sum signal SG is generated, the frequency of which correspond to twice the frequency of the interrogation signal AS. The full-wave rectification ensures that the absolute values of the receive signals E1", E2", E3" are added up, regardless of their sign. In this manner, it is ensured that the receive signals E1", E2", E3" do not weaken each other or even cancel each other out during the adding process, which would happen without rectification if the transponder is aligned such that one of the receiving coils L1, L2, L3 is penetrated by the interrogation signal AS in the one direction, and another one of the receiving coils L1, L2, L3 is penetrated in the other direction. In this case, the (non-rectified) receive signal E1", E2", E3" of the one coil L1, L2, L3 and the (non-rectified) receive signal E1", E2", E3" of the other coil L1, L2, L3 would have a phase shift of 180° so that during adding up, the two receive signals E1", E2", E3" would partially, in extreme cases even completely, cancel each other out. The complete cancellation would occur when the levels of the two receive signal E1", E2", E3" have the same value.

In contrast to that, the transponder 3 according to the invention uses each half-wave of each of the receive signals E1", E2", E3" for increasing the level of the sum signal SG so that independent of the transponder's 3 position and spatial orientation with regard to the interrogator 2 generating the interrogation signal AS, a stable sum signal SG is generated. The frequency of the sum signal SG corresponds here to twice the frequency of the received interrogation signal AS so that it can be used as a time base signal in particular for synchronizing the transponder 3 with the interrogator 2.

The sum signal SG is fed to a comparator 8 which compares the pulsating sum signals SG with a reference signal RS in order to generate a first clock signal TS1, the frequency of which corresponds to twice the frequency of the interrogation signal AS. In general, a comparator 8 is a circuit for comparing two input signals SG, GS. Depending on which of the two input signals SG, GS is greater, the output signal TS1 of the comparator 8 takes a first value or a second value. Comparing now the sum signal SG by means of the comparator 8 with a reference signal RS results in a binary clock signal TS1 at the output of the comparator 8, the frequency of which binary clock signal corresponds to twice the frequency of the interrogation signal AS, wherein the binary clock signal TS1 can be further processed in a simple manner. The comparator 8 can be formed by means of a conventional operational amplifier.

Here, a low pass 9 is provided for filtering the pulsating sum signal SG, wherein a filtered pulsating sum signal SG generated by means of the low pass 9 is the reference signal RS fed to the comparator 8. A low pass 9 is generally a filter which allows signal portions below a cutoff frequency to pass almost without attenuation and increasingly attenuates signal portions above the cutoff frequency. If now by means of such a low pass 9, a filtered pulsating sum signal RS is generated from the sum signal SG and used as a reference signal RS, an automatic adaptation of the reference signal RS to the level of the sum signal SG takes place so that changes of the current value of the sum signal SG result in a change of the value of the first binary clock signal TS1 so that the first clock signal TS1 comprises the clock information independent of the level of the sum signal SG.

Furthermore, the first clock signal TS1 is fed to a frequency divider 10 so as to generate a second clock signal TS2 with a lower frequency. A frequency divider 10 is generally an arrangement which reduces the frequency of an input signal TS1 by a factor, preferably by an integer factor. Using a frequency divider 10 allows generating the second clock signal TS2 with a frequency as needed, wherein also the second clock signal TS2 contains the information on which frequency that the interrogation signal has.

Preferably, the frequency divider 10 is a frequency halver 10. In the case of a frequency halver 10, the output signal TS2 generally has a frequency which corresponds to half of the frequency of the input signal TS1. Thus, in the present case, a second clock signal TS2 is generated in a simple manner, the frequency of which corresponds to the frequency of the interrogation signal AS.

Preferably, the transponder 1 is at least partially implemented as a CMOS-integrated circuit. An integrated circuit is an integrated circuitry, which means that an electronic circuit comprising a plurality of electronic components and associated wiring is formed on a common substrate, also called chip. For this, a fully integrated construction can be provided in which all electronic components of the transponder 1 are arranged on exactly one substrate.

Furthermore, the transponder 1 according to the invention can be produced using CMOS technology, which means that PMOS transistors, also called p-channel metal-oxide-semiconductor transistors, as well as NMOS transistors, also called n-channel metal-oxide-semiconductor transistors, can be arranged on a common substrate.

The transponder 3 according to the invention enables in particular the generation of a time base signal SG, T1, T2 by means of a plurality of coils L1, L2, L3 from an amplitude-modulated interrogation signal AS, the amplitude of which is changed in order to transmit different values, since the sum signal SG can be reliably generated even if the amplitude of the interrogation signals AS is very small due to the modulation.

REFERENCE LIST

1 Transponder system
2 Interrogator
3 Transponder
4.1 First limiter and amplifier
4.2 Second limiter and amplifier
4.3 Third limiter and amplifier
5.1 First voltage-to-current converter
5.2 Second voltage-to-current converter
5.3 Third voltage-to-current converter
6.1 First full-wave rectifier
6.2 Second full-wave rectifier
6.3 Third full-wave rectifier
7 Summing element
8 Comparator
9 Low pass
10 Frequency divider
L Coil of the interrogator
P Connections of the coil of the interrogator
AS Interrogation signal
f0 Frequency of the interrogation signal
L1 First coil of the transponder
S1 Connections of the first coil of the transponder
A1 Axis of the first coil of the transponder
E1 First receive signal
GE1 Rectified first receive signal
L2 Second coil of the transponder
S2 Connections of the second coil of the transponder
A2 Axis of the second coil of the transponder
GE2 Rectified second receive signal
L3 Third coil of the transponder
S3 Connections of the third coil of the transponder
A3 Axis of the third coil of the transponder
GE3 Rectified third receive signal
SG Pulsating sum signal
RS Reference signal
TS1 First binary clock signal
TS2 Second binary clock signal

What is claimed is:

1. A transponder for receiving a wireless electromagnetic interrogation signal and transmitting a wireless electromagnetic response signal, comprising:
    a first coil, coupled to receive the interrogation signal, the first coil acting as an antenna and generating a first wired electrical receive signal from the interrogation signal;
    at least one further coil, coupled to receive the interrogation signal, the at least one further coil acting as an antenna and generating a second wired electrical receive signal from the interrogation signal, wherein an axis of the first coil and an axis of each of the at least one further coil are aligned differently in the space;
    a plurality of full-wave rectifiers, coupled to the first coil and the at least one further coil, the plurality of full-wave rectifiers rectifying the first and second wired electrical receive signals; and
    a summing element, coupled to the plurality of full-wave rectifiers, the summing element summing up the rectified first and second wired electrical receive signals generated by the plurality of full-wave rectifiers and generating a pulsating sum signal, the frequency of the pulsating sum signal being corresponding to twice the frequency of the interrogation signal.

2. The transponder according to claim 1, wherein a total of three coils is provided, the axes of the three coils are arranged perpendicular to each other.

3. The transponder according to claim 1, wherein a comparator is coupled to the summing element and compares the pulsating sum signal with a reference signal in order to generate a first clock signal, the frequency of the first clock signal being corresponding to twice the frequency of the interrogation signal.

4. The transponder according to claim 3, wherein a low pass filter filters the pulsating sum signal, and generates a filtered pulsating sum signal (RS) that is further used as the reference signal by the comparator.

5. The transponder according to claim 3, wherein the first clock signal is fed to a frequency divider to generate a second clock signal with a lower frequency.

6. The transponder according to claim 5, wherein the frequency divider is a frequency halver so that the frequency of the second clock signal is equal to the frequency of the interrogation signal.

7. The transponder according to claim 1, wherein a limites is applied to limit the amplitude of each of the first and second wired electrical receive signal.

8. The transponder according to claim 1, wherein an amplifier is coupled to amplify each of the first and second wired electrical receive signal.

9. The transponder according to claim 8, wherein the amplifier is formed as a structural unit.

10. The transponder according to claim 1, wherein a voltage-to-current converter is coupled to each of the first coil and the at least one further coils in order to feed each of the first and second wired electrical receive signals as a current signal to the summing element.

11. The transponder according to claim 10, wherein the voltage-to-current converters is an operational transconductance amplifiers.

12. The transponder according to claim 1, wherein said transponder is at least partially implemented as CMOS-integrated circuit.

* * * * *